United States Patent
Pineau

[15] 3,690,640
[45] Sept. 12, 1972

[54] VIBRATION DAMPER

[72] Inventor: Andre Lucien Pineau, 12 Rue de Bearn 92, Saint-Cloud, France

[22] Filed: Jan. 26, 1971

[21] Appl. No.: 109,895

[30] Foreign Application Priority Data

Feb. 3, 1970   France..................7003678

[52] U.S. Cl................................267/137
[51] Int. Cl.................................F16k 1/36
[58] Field of Search............267/136, 137, 140, 141

[56] References Cited

UNITED STATES PATENTS 2,677,851   5/1954   Beyer..................267/141

FOREIGN PATENTS OR APPLICATIONS 627,726   1/1963   Belgium..................267/140

*Primary Examiner*—James B. Marbert
*Attorney*—Marks & Clerk and John Lezdey

[57] ABSTRACT

Damper of vibrations between two elements comprising a center rod adapted to be connected to one of the elements and a mount surrounding the rod and adapted to be connected to the other element. The rod and mount are interconnected by two elastically yieldable bell-shaped membranes. The latter have at their apices apertures in which the rod is engaged and are connected to the mount at their peripheries.

11 Claims, 4 Drawing Figures

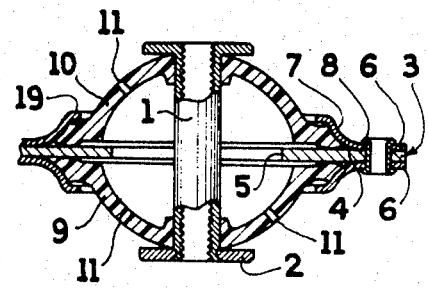
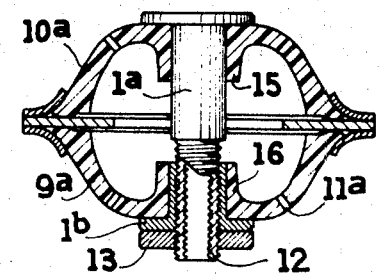
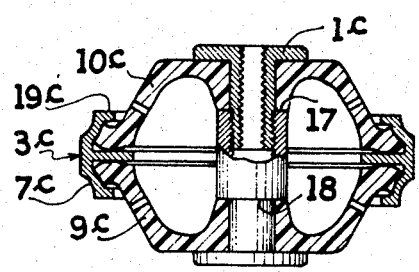
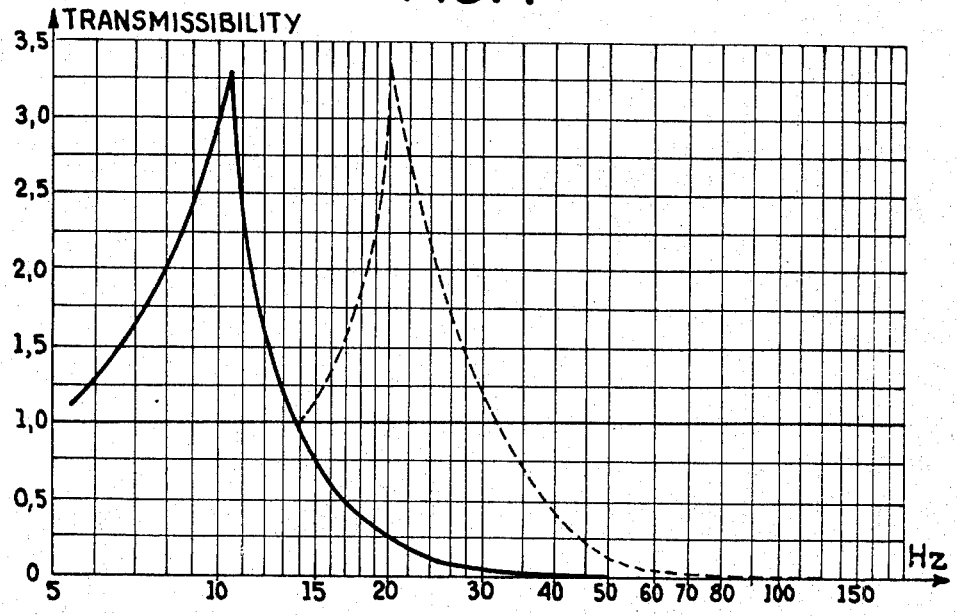

VIBRATION DAMPER

The present invention relates to vibration dampers between two members or structures.

Devices adapted to damp or absorb vibrations are known which comprise mainly a block of an elastomer material, for example rubber, mounted on a tubular spacer member adapted to be rendered integral with a first structure, the block being provided in its median part with a peripheral recess in which is engaged a ring adapted to be fixed to a second structure.

The vibrations between the two structures are damped by the elastic deformation of the block and by the internal hysteresis of the rubber employed.

A damper of this type has a number of drawbacks:

Its frequency of resonance is relatively high so that it can only afford a correct damping or absorption of vibrations in the neighborhood of 50 Hz.

Further, as the block of elastomer material is held in the center part by the spacer tube, the radial deformation of the block is very limited so that the damper is rendered less flexible. Moreover, the damping capacity of the known device depends practically solely on the elastically yieldable material employed in the block of the damper. Consequently, a damper of this type can only be employed for a very limited range of loads for a given size.

An object of the invention is to remedy the aforementioned drawbacks and provide a vibration damper which affords an effective damping of frequencies ranging from very low frequencies and which, while being simple in construction, is capable of operating under a wide range of loads.

The invention provides a damper of vibrations between two elements, such as structures or members, comprising a center rod adapted to be rendered integral with a first of the elements and a mount surrounding the rod and adapted to be rendered integral with the second element, wherein the rod and the mount are interconnected by two elastically yieldable bell-shaped membranes, said membranes having apertures at their apices in which said rod is engaged and peripheries which are connected to the mount.

Further features and advantages of the invention will be apparent from the ensuing description with reference to the accompanying drawing.

In the drawing:

FIG. 1 is a sectional view of a first embodiment of the damper according to the invention;

FIG. 2 is a sectional view of a first modification of the damper shown in FIG. 1;

FIG. 3 is a sectional view of a second modification of the damper shown in FIG. 1, and FIG. 4 is a diagram showing a comparison of the performances of a damper of known type and those of a damper according to the invention.

The damper shown in FIG. 1 comprises a tube 1 provided at its ends with flanges 2 and adapted to be rendered integral with a first structure (not shown). The tube can be internally smooth or screwthreaded, depending on the manner in which it is fixed to the structure. A mount 3, constituted by a metal plate 4 having a circular aperture 5, is clamped between two side walls 6 by rivets 8 or the like. Each wall 6 has an annular curved portion 7 extended by a horizontal flange portion 19. The mount 3 is connected to the tube 1 by two elastically yieldable bell-shaped membranes 9 and 10. This mount can be rendered integral with a second structure (not shown).

The apex of each membrane has an aperture containing the tube 1 and is retained by a flange 2 of the tube 1 which therefore acts as a spacer member.

The peripheries of the membranes 9 and 10 bear in recesses defined by the portions 7 of the side walls 6 and the plate 4. They are maintained in the recesses either by the effect of a simple wedging or by adhesion or vulcanization to the curved portions 7. The horizontal flange 19 permits increasing the allowable forces beyond which the periphery of the membrane tends to be pulled out of the recess.

The apices of the membranes 9, 10 are either slidably mounted on the tube 1 and retained externally by flanges 2 or fixed to the flanges 2 by adhesion or vulcanization.

In the latter case, in the course of operation of the damper, if one of the membranes works under compression the other works under tension.

The membranes 9 and 10 are provided in the known manner with small orifices 11 whereby the interior of the damper is put in communication with the atmosphere so that there is no pneumatic effect on its operation.

The modification of the damper according to the invention shown in FIG. 2 comprises a spacer tube in two parts 1a and 1b. The part 1b of the tube has one end 12 which is screwthreaded and on which is screwthreadedly engaged the part 1b so that the distance between the flanges 2a and 2b can be adjusted and the membranes 9a and 10a can be prestressed in accordance with requirements. A lock-nut 13 locks the part 1b on the part 1a. The membranes 9a and 10a also comprise sleeves 15 and 16 which are in one piece with the membranes and stiffen the latter locally.

FIG. 3 shows a second modification of the damper according to the invention, the mount 3c comprising the curved portion 7c and the flanges 19c being made in one piece, for example by machining on a lathe. The tube 1c of this damper has two shoulders 17, 18 adapted to cause the apices of the membranes 9c, 10c to move with the spacer tube.

The membranes 9c and 10c have, moreover, a shape slightly different from those of the membranes in the dampers shown in the FIGS. 1 and 2.

It will be understood that the two modifications shown in FIGS. 2 and 3 can be so combined as to provide a damper whose membranes are made to move with the spacer tube and which can be prestressed in such manner as to adapt the response of the damper.

It is also possible to combine the possibilities of adhesion or abutment of each of the membranes to suit the desired result, from example by leaving one membrane free and putting the other in abutting or adhered relation so as to adapt the assembly to a preferential axis of operation.

In the dampers just described, the two membranes are identical. However, it is possible, according to needs, to dispose on each side of the mount membranes having different thicknesses or mixtures which renders the damper stiffer in respect of forces applied to the thicker or the stronger membrane.

FIG. 1 shows a diagram in which the curves in dotted line and in full line respectively represent the transmissibility as a function of the frequency of a damper of the known type mentioned hereinbefore and of a damper according to the invention.

It will be seen from these curves that the conventional damper has a frequency of resonance of 20 Hz. The damping zone only starts in the region of 30 Hz and there still remains more than 10percent of vibratory amplitude at 50 Hz. The amplitude thereafter decreases, but it still retains an appreciable value beyond 70 Hz.

The damper according to the invention, when tested under the same conditions of loads and vibratory amplitude, has a frequency of resonance of less than 10 Hz. The damping zone starts at 14 Hz. At 30 Hz there remains only 5percent of the initial amplitude which thereafter decreases regularly and eventually becomes negligible at about 50 Hz.

The damper according to the invention therefore has a much higher efficiency than that of the conventional damper in a zone corresponding to the frequencies between 15 and 50 Hz which are those most frequently met with in industrial applications.

Further, the possibility of prestressing the membranes according to needs renders the damper of utility with a wider range of loads. Further, the fact that it is possible to connect the spacer tube to one of the membranes or to both of them either by adhesion or vulcanization of the apices of each membrane to the flanges of the spacer tube or by forming shoulders on the later in such manner as to wedge the apices of the membranes between the flanges and the shoulders, the damper can be adapted to the amplitude and to the direction of the loads to which it is subjected by the two structures between which it is mounted.

Having now described my invention what I claim and desire to secure by Letters Patent is:

1. A damper of vibrations between two elements, comprising a center rod adapted to be rendered integral with one of said elements, a mount surrounding the rod and adapted to be rendered integral with the other element, two elastically yieldable bell-shaped membranes interconnecting said rod and said mount, each membrane having an apex at which means define an aperture in which said rod is engaged and a periphery connected to the mount.

2. A damper as claimed in claim 1, wherein said rod comprises at its ends flanges adapted to retain said apices of said membranes externally.

3. A damper as claimed in claim 2, wherein said apices of said membranes are fixed to said flanges by adhesion.

4. A damper as claimed in claim 2, wherein said apices of said membranes are fixed to said flanges by vulcanization.

5. A damper as claimed in claim 1, wherein said rod comprises two parts screwed one into the other so as to make it possible to apply a prestressing to said membranes.

6. A damper as claimed in claim 1, wherein said rod further comprises shoulders adapted to connect said apices of said membranes to said rod so that said membranes move with said rod.

7. A damper as claimed in claim 1, wherein said mount comprises two annular recesses in which said peripheries of said membranes are held in position.

8. A damper as claimed in claim 7, wherein the mount comprises a center plate having an aperture through which said rod extends, two side walls in clamped relation to said plate and having curved inner portions, said annular recesses being defined by opposed faces of said plate and said curved portions of said side walls.

9. A damper as claimed in claim 8, wherein said membranes bear on said opposed faces of said plate and on said curved portions of said side walls.

10. A damper as claimed in claim 7, wherein said mount is in a single piece.

11. A damper as claimed in claim 7, wherein said curved portions terminate in inner annular horizontal flanges.

* * * * *